Figure 1:
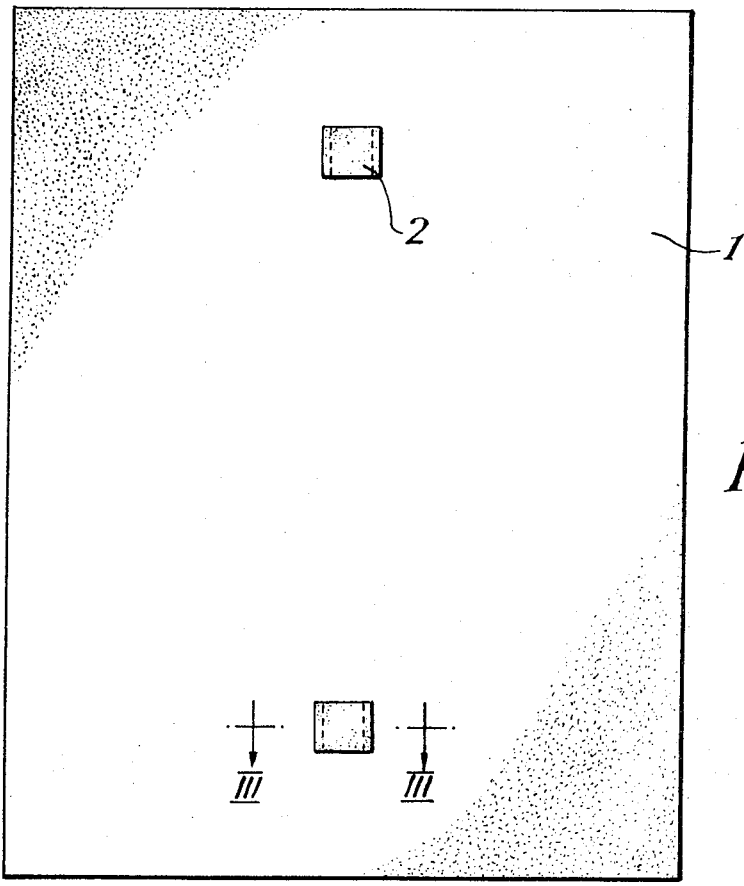

United States Patent

Edwards

[15] 3,676,970

[45] July 18, 1972

[54] FILED SURFACE AND METHOD OF APPLICATION

[72] Inventor: Frederick James Edwards, Northumberland, England

[73] Assignee: Thermal Syndicate Limited, Northumberland, England

[22] Filed: April 15, 1970

[21] Appl. No.: 28,632

[30] Foreign Application Priority Data

April 24, 1969 Great Britain......................20,926/69

[52] U.S. Cl.................................................52/385, 52/391
[51] Int. Cl. ........................................................E04f 13/14
[58] Field of Search....................52/384, 385, 389, 390, 391,
52/392, 573, 747

[56] References Cited

UNITED STATES PATENTS

| | | | |
|---|---|---|---|
| 830,313 | 9/1906 | Fenn........................................ | 52/386 |
| 1,028,058 | 5/1912 | Von Nordenkampf................... | 52/384 |
| 2,132,499 | 10/1938 | Tuthill...................................... | 52/391 |
| 2,925,631 | 2/1960 | Larson et al............................. | 52/390 |
| 750,954 | 2/1904 | Ellis........................................ | 52/384 |
| 2,194,653 | 3/1940 | Gell......................................... | 52/384 |
| 2,872,804 | 2/1959 | Baldanza................................ | 52/384 |

*Primary Examiner*—Henry C. Sutherland
*Attorney*—Curtis, Morris & Safford

[57] ABSTRACT

The invention relates to a cladding panel for a building and a method of attaching such a cladding panel to a building. The cladding panel, made of vitreous silica or a glass having a $SiO_2$ content of greater than 95 percent, is provided with at least one integrally formed projection made of the same material as the rest of the panel, the projection, or each projection having a dove-tailed cross-section in a plane normal to the rear surface of the panel.

The method and apparatus further a backing sheet attached to the building and which locks the projection into a keyhole recess formed in the backing sheet to sandwich an adhesive composition between the panel and the sheet.

6 Claims, 5 Drawing Figures

PATENTED JUL 18 1972 3,676,970

FREDERICK JAMES EDWARDS
*INVENTOR*

BY CURTIS, MORRIS & SAFFORD
*ATTORNEY*

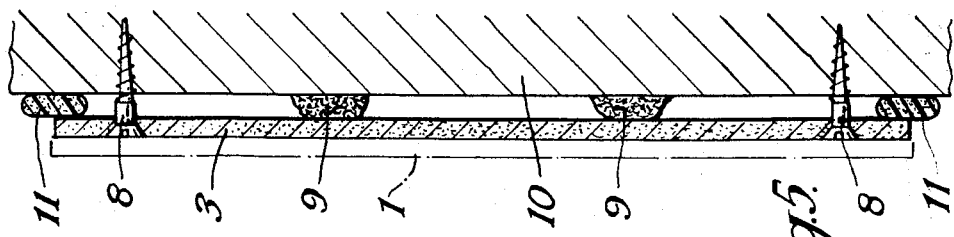
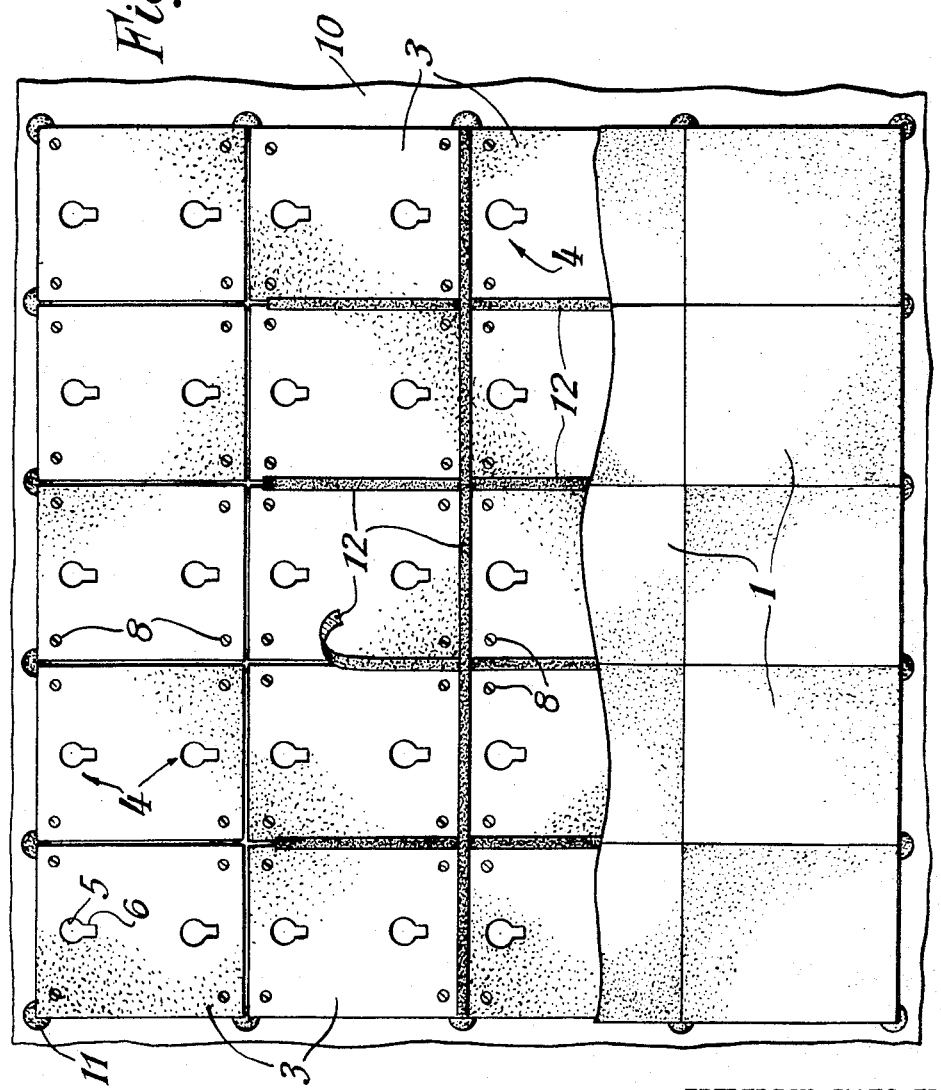

FILED SURFACE AND METHOD OF APPLICATION

This invention relates to an improved method of attaching facing panels of vitreous silica or high silica content glasses (hereinafter referred to as "vitreous facing panel") to walls, floors or ceilings and to a composite unit for use on walls, floors or ceilings or as a partition for building purposes.

It has already been proposed to attach vitreous facing panels by a method which involves moulding inserts of metal into the vitreous facing panels, the inserts projecting from the rear surface of the panel, and this invention relates to an improved method and to a modified form of panel in which the projecting members are of vitreous silica or high silica content glass. "High" in connection with the silica content of a glass means, in this specification, greater than 95 percent by weight of $SiO_2$.

Vitreous silica is a unique material for the cladding of buildings in view of its unequalled fire and corrosion resistance, the permanent and high quality finish which can be obtained on facing panels and the wide range of textural and colored effects which can be produced. One of the problems which has impeded the large scale acceptance of vitreous silica (and to some extent also the use of high silica content glasses) as a cladding material has been difficulties relating to the securement of the vitreous facing panels on the structure of the building in a secure and foolproof manner using unskilled or, at best, semi-skilled labor. This invention relates to a method of attaching vitreous facing panels to a building structure which is simple to perform and which does result in a fully weatherproofed cladding for the building that meets the most stringent regulations regarding safe securement of facing panels.

According to one aspect of the present invention a method of attaching vitreous facing panels to a building structure, each vitreous facing panel comprising at least one portion projecting from the rear surface of the panel, the projecting portion having a dove-tailed cross-section in a plane normal to said rear surface and being integrally formed with the panel, comprises the steps of securing to the structure a backing sheet for each vitreous facing panel, each backing sheet being of a rigid fire-proof material and having at least one locking recess or aperture formed therein so that the locking recess or aperture faces away from the structure to which the backing sheet is attached, applying a deformable water-insoluble adhesive material to the sheet at least over the regions against which the panel will lie and pressing the panel onto the backing sheet so that each projection thereon passes into a locking recess or aperture and can be locked therein by relative movement of the facing panel to the backing sheet in the plane of the facing panel.

In rear elevation, the projecting portion of each facing panel may be circular, oval or polygonal. The number and disposition of the projecting portions on each facing panel depends on the surface area and thickness of the facing panel. Preferably the aggregate surface area of the projecting portions (as viewed normal to the plane of the rear surface) exceeds one per cent of the area of the rear surface and the separation between projecting portions (measured in the plane of said rear surface between centers) is less than two feet.

The backing sheet (conveniently a sheet of asbestos board) is conveniently provided with one "keyhole recess or aperture" (as hereinafter defined) for each projecting portion, at least the retaining slot of the keyhole recess or aperture being chamfered on the side away from the panel to mate with the chamfered edge of the dovetail projection. The backing sheet (with the correct number and relative disposition of keyhole recesses or apertures to accommodate a particular vitreous facing panel) is fixed in place by any conventional fixing member (e.g. non-corrosive bolts or screws) and is then coated with the resilient adhesive (which may or may not be of the hardening variety) at least over the regions against which the peripheral edges of the panel will lie. The vitreous facing panel is then secured in place by engaging the projecting portions of the panel in the keyhole recesses or apertures of the backing sheet and sliding the panel on the backing sheet to accommodate the projections in the retaining slots of the keyhole recesses or apertures. During the panel-securing operation, the adhesive is compressed between the panel and the backing sheet and remains sandwiched therebetween to form a watertight seal. A hydrophobic oil-based mastic composition is the preferred adhesive but a hydraulic cement can also be used.

Throughout this specification by a "keyhole recess or aperture" we mean a recess or aperture having an enlarged opening at one end of a retaining slot, the opening being dimensioned for the insertion of the projecting portion therein in the direction normal to the plane of said one surface of the panel while the retaining slot allows the projecting portion to slide therealong, if the outer wider end of the projecting portion is located in the slot, but will not allow the projecting portion to be withdrawn from the retaining slot in the direction normal to said one surface of the panel.

The projecting portion or portions is or are conveniently formed from blocks of vitreous material in a first fusing operation and the shaped blocks are then integrally fused into a sheet of vitreous silica or high silica content glass when the panel is formed, temperature conditions during the formation of the panel being controlled to ensure that the dove-tailed projecting portion or portions do not distort. Thus, for example, the panels can be formed in shallow graphite trays having recesses therein to receive the projecting portions of the preformed blockS, the tray being filled with silica sand (normally containing traces of one or more suitable coloring additives) to cover the blocks. The sand, and just those regions of the blocks embedded in the sand, are then fused in a second operation to form a vitreous facing panel integral with the projecting portions.

A facing panel of pure vitreous silica having at least one portion projecting from the rear surface of the panel, the projecting portion having a dove-tailed cross-section in a plane normal to said one surface, and being integrally formed with the panel, constitutes a further aspect of the invention.

A composite unit which comprises a vitreous facing panel attached to a backing sheet with a layer of adhesive sealing the gap between the panel and the sheet, at least around the periphery of the former, constitutes a further aspect of the invention.

Normally a plurality of backing sheets will be placed side by side to form a substantially planar surface on which the vitreous facing panels will be secured (typically we make the backing sheets of the same shape and area as the facing panels). The joins between the adjacent backing sheets can then be covered with an adhesive sealing strip of waterproof character (e.g. a metal foil coated with a hydrophobic pressure-sensitive adhesive).

Figure 2:
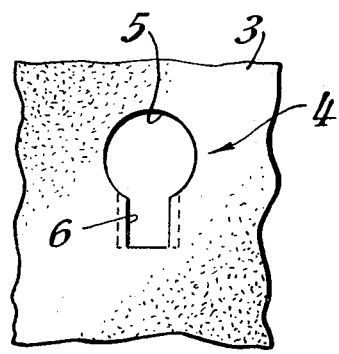
Figure 3:
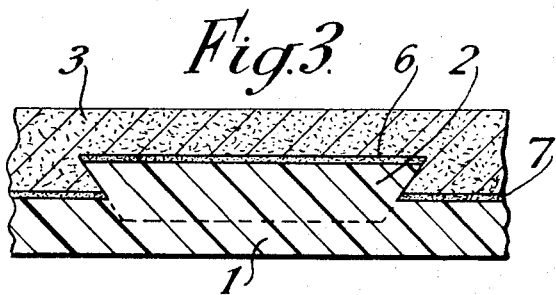

The invention will be further described in the following Examples and with reference to the accompanying drawings, in which:

FIG. 1 is a rear view of a facing panel,

FIG. 2 is a portion of a backing sheet to which the panel of FIG. 1 can be attached showing the "keyhole" recess, FIG. 3 is a section on the line III—III showing how the panel is attached to the backing sheet, FIG. 4 shows a series of backing sheets attached to a wall structure some of which have facing panels attached thereto, and FIG. 5 shows a sectional side view of one of the backing sheets of FIG. 4.

EXAMPLE 1

A colored vitreous silica panel one-fourth inch thick, 15 inches long and 12 inches wide is produced by fusing a layer of pure silica sand in a graphite mould which contains two tapered blocks of square cross-section each 1 × 1 inch and some three-eighths inch thick. The blocks project one-fourth inch from the lower face of the sand layer and are received in recesses in the graphite. As the sand fuses, the upper one-eighth inch of the blocks also fuses so that on cooling a vitreous silica panel integral with two projections is removed from the mould. FIG. 1 shows such a panel 1 with projections 2 extending from the rear surface, (the dove-tail shape of the projections being seen in FIG. 3).

The panel 1 is secured to a backing sheet 3 of asbestos (shown in FIG. 2) having two keyhole recesses 4 formed in the front surface thereof. In the illustrated embodiment, access hole 5 of recess 4, is shown as a circularly shaped upper end. The access hole 5 of each recess 4 allows a projection 2 to be inserted therein and then slid into the narrower retaining slot 6. FIG. 3 which is a section on the line III—III of FIG. 1 (after attachment to the sheet 3) shows how a projection is held in its keyhole recess and also shows a layer of adhesive 7 sealing the gap between the panel 1 and the backing sheet 2.

EXAMPLE 2

A panel of the same size as that described in Example 1 is produced in similar manner but using two circular blocks one inch in diameter for the projections.

EXAMPLE 3

A panel three-eighths inch thick, 36 inches long and 24 inches wide is formed with four projections on its rear surface each projection having an area of 9 square inches. The projections are disposed on the rear surface of the block with their centers at the corners of a square 18 inches by 12 inches. The backing sheet has four appropriately placed keyhole recesses so that attachment of the panel to the backing sheet involves placing the panel against the backing sheet with the projections in the recesses and pulling the panel downwards relative to the backing sheet to urge the projections along the retaining slots. An adhesive is again used around the edges of the panel to seal the gap.

The panels described in the foregoing Examples can be used for facing a building, the backing sheets being secured by means of screws into the desired position on the building so that the retaining slots are directed downwards. Subsequently the panels are locked into place, on the the backing sheets, the adhesive serving to prevent ingress of water behind the panel.

Normally the retaining slots of the keyhole recesses are directed downwardly when the vitreous silica panel is used to face a vertical wall as this proves convenient in practice and gives a high degree of security of fixing. It will be appreciated that other orientations of the retaining slots may be utilized as circumstances dictate.

FIGS. 4 and 5 show in further detail how the vitreous facing panel of FIG. 1 is attached to a wall of a building. Using a separate backing sheet for each facing panel, the backing sheets are screwed to the wall using stainless steel (or bronze) screws 8 one or more blobs 9 of cement (or the like) being located between the sheet 3 and the wall 10. Resilient pads 11 are also placed between the sheets 3 and the wall to urge the latter away from the wall and permit adjustment of the screws 8 (four per sheet) for making the backing sheets coplanar. Lengths of a water-proof tape 12 then cover the gaps between the sheets 3 (left to allow for building settlement — wind movement, thermal expansion etc.) to prevent moisture driving through the gaps to the wall behind the backing sheets. FIG. 4 shows the lowermost layer of facing panels 1 in place, the adhesive securing the facing panels 1 to the backing sheets 3, not being shown in FIG. 4. Since the erection of the facing panels is the last operation, these can be safely stored (with minimum risk of breakage or damage) until the array of backing sheets has been erected and inspected.

What is claimed is:

1. A method of attaching vitreous facing panels to a building structure, via backing sheets, each vitreous facing panel comprising at least one portion projecting from the rear surface of the panel, the projecting portion having a dove-tailed cross-section in a plane normal to said rear surface and being integrally formed with the panel, and each backing sheet being of a rigid fire-proof material having at least one locking recess or aperture formed therein and positioned so as to co-act with a projecting portion of a respective panel, said method comprising the steps of:
   a. securing to the structure an individual backing sheet for each respective vitreous facing panel, so that the locking recess or aperture faces away from the structure to which the backing sheet is attached,
   b. resiliently spacing said backing sheets from the surface of said structure and securing them against such resilient spacing so as to be relatively coplanar and further securing said adjacent sheets in place spaced from each other sufficient to allow for thermal expansion and the like,
   c. covering the gaps resulting from such spacing with a water-proof adhesive sealing strip,
   d. applying a deformable water-proof adhesive material to the sheet at least over the regions against which the panel will lie, and
   e. pressing the panel onto the backing sheet so that each projection thereon passes into a locking recess or aperture and is locked therein by relative movement of the facing panel to the backing sheet in the plane of the facing panel.

2. A method of attaching facing panels of pure vitreous silica to a building structure, each facing panel comprising at least two portions projecting from the rear surface of the panel, the projecting portions each having a dove-tailed cross-section in a plane normal to said rear surface and being of vitreous silica integrally formed with the panel, said method comprising:
   a. sandwiching between a backing sheet for each facing panel and the structure an adhesive composition and at least one resilient pad,
   b. securing each backing sheet to the structure using screws driven through the backing sheet into the structure,
   c. adjusting the screws against the resilience of the pad or pads to compress the adhesive composition and make the backing sheet coplanar with an adjacent backing sheet, each backing sheet being of a rigid refractory material and having at least one locking recess or aperture formed therein so that the locking recess or aperture faces away from the structure to which the backing sheet is attached,
   d. applying a deformable water-insoluble adhesive material to the outwardly facing side of each backing sheet, and
   e. pressing a facing panel onto each backing sheet so that each projection thereon passes into a locking recess or aperture and is locked therein by relative movement of the facing panel to the backing sheet in the plane of the facing panel.

3. A method as claimed in Claim 2, further comprising the steps of leaving gaps between adjacent backing sheets, covering the gaps subsequently with a water-proof adhesive sealing strip and thereafter applying the deformable water-insoluble adhesive material to the backing sheets.

4. A composite structural surfacing unit comprising a plurality of vitreous facing panels each having at least one portion projecting from the rear surface of the panel, the projecting portion having a dove-tailed cross-section in a plane normal to said panel's surface and being integrally formed with the panel, and at least one rigid fire-proof backing sheet attached to said panels by engagement of each projecting portion of the panel in a recess or aperture in the backing sheet, each recess or having an enlarged opening at one end of a retaining slot, the opening being dimensioned for passing of the projecting portion there-through in the direction normal to the plane of said rear surface of the panel while the retaining slot locks onto the outer wider end of the projecting portion slid therealong, thereby preventing the projecting portion from being withdrawn from the retaining slot in the direction normal to said one surface of the panel, adjustable fastening means affixing said backing sheet to the structure to be surfaced, resilient spacing means positioned between said backing sheet and the structure surface for accommodating surface irregularities and for giving proper alignment of the backing sheet in conjunction with the fastening means.

5. A unit as claimed in claim 4 wherein said fastening means includes both fastener hardware and adhesives, and further comprising a plurality of backing sheets arranged substantially coplanarly and spaced sufficiently to accommodate thermal expansion and the like, the gaps between said backing sheets being sealed with a flexible water-proof barrier, and water-proof adhesive applied between said panel including its projecting portion and its respective backing sheet.

6. A unit as claimed in claim 4 wherein each of said panels has a respective individual backing sheet.

* * * * *

UNITED STATES PATENT OFFICE
CERTIFICATE OF CORRECTION

Patent No. 3,676,970    Dated July 18, 1972

Inventor(s) Frederick James Edwards

It is certified that error appears in the above-identified patent and that said Letters Patent are hereby corrected as shown below:

In the title change "Filed" to --Tiled--.

Signed and sealed this 2nd day of January 1973.

(SEAL)
Attest:

EDWARD M. FLETCHER, JR.         ROBERT GOTTSCHALK
Attesting Officer               Commissioner of Patents